June 12, 1923.

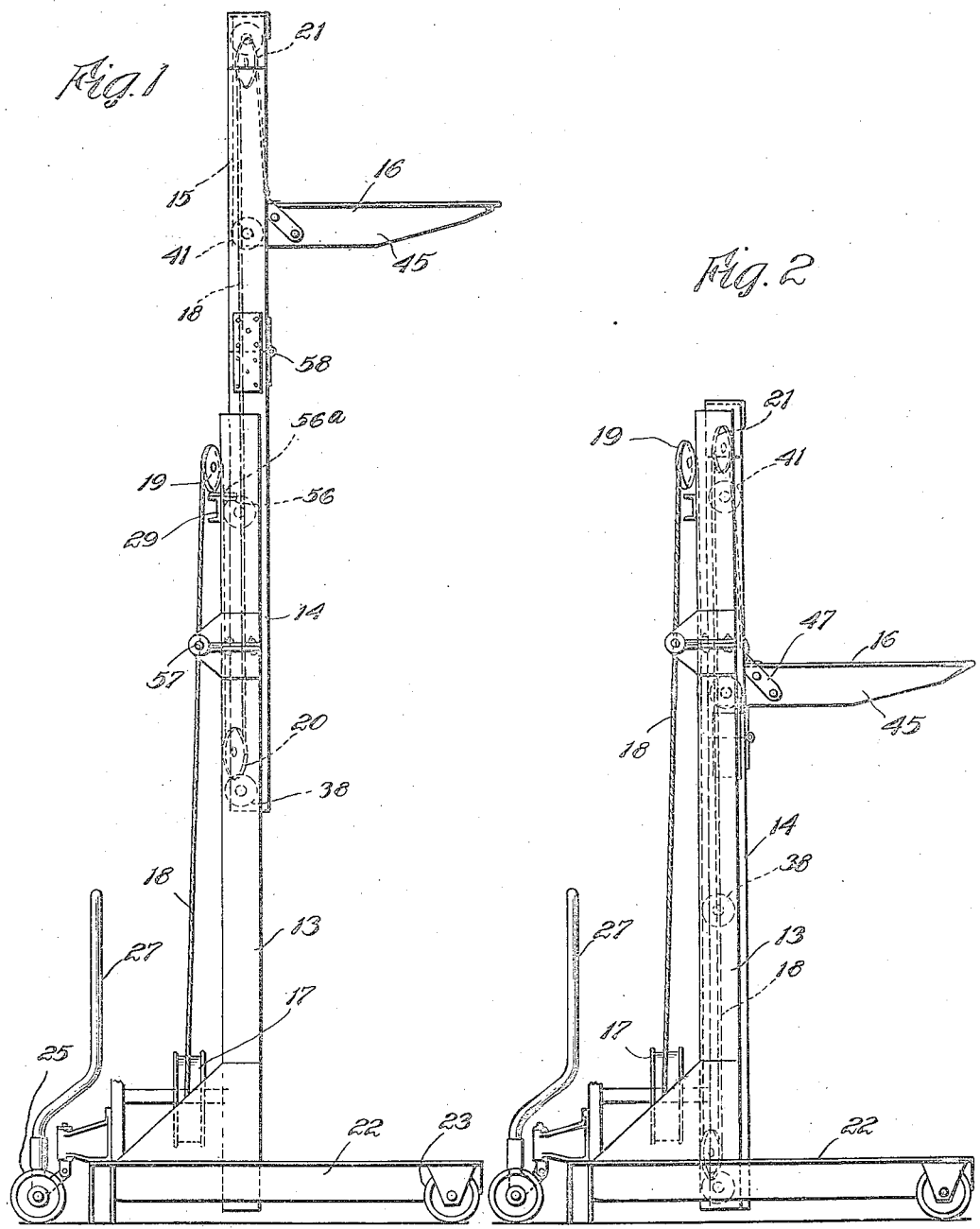

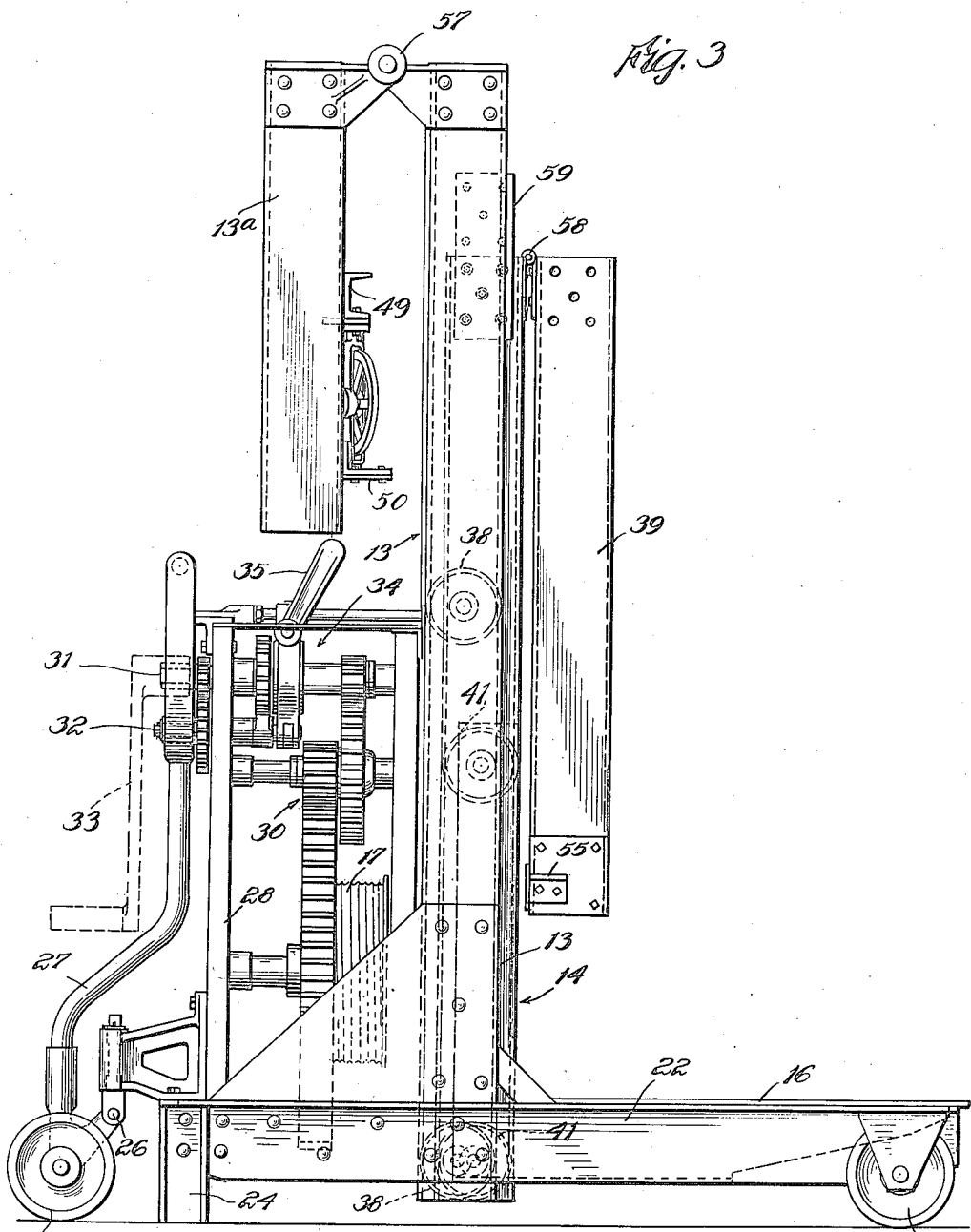

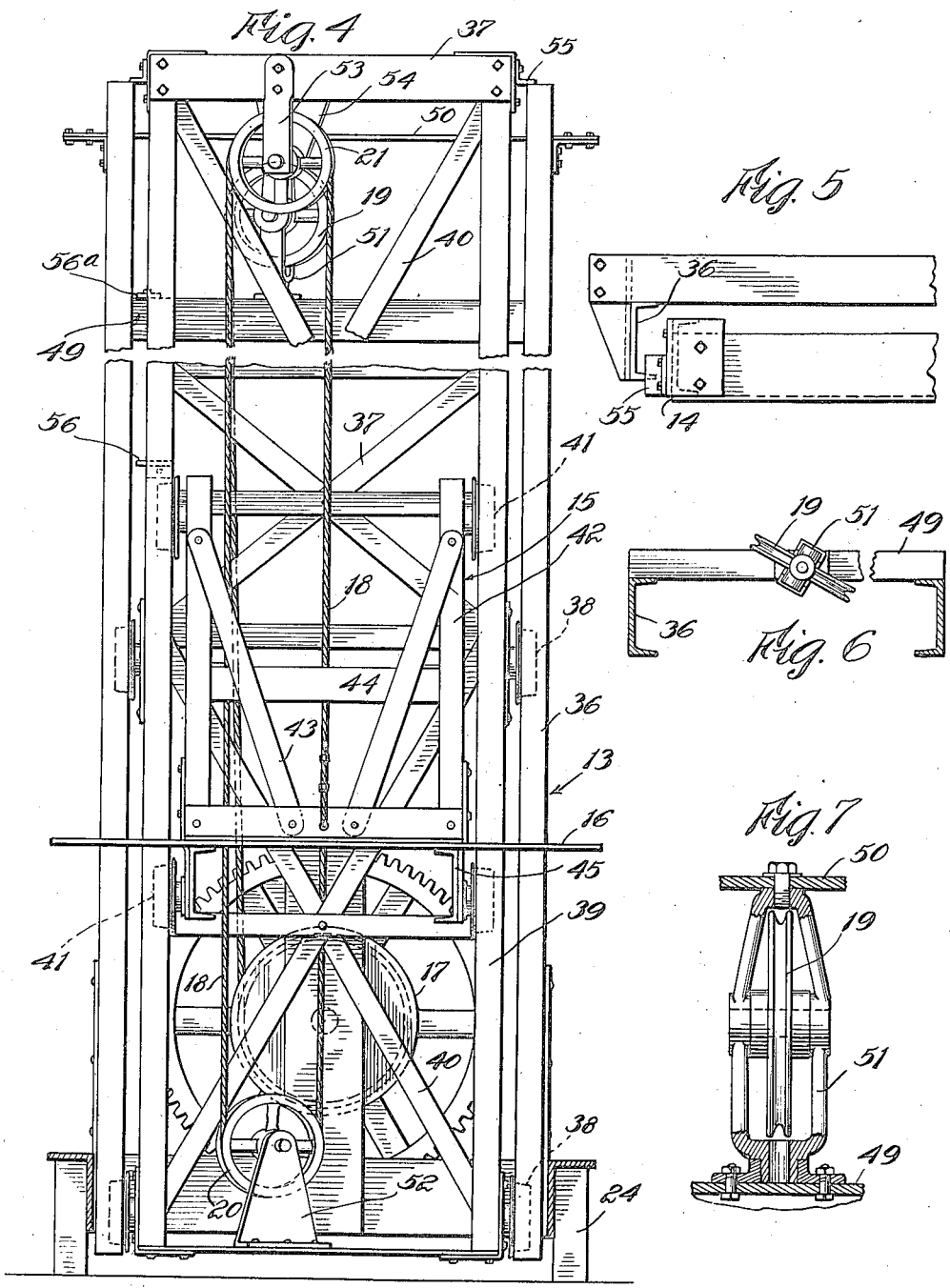

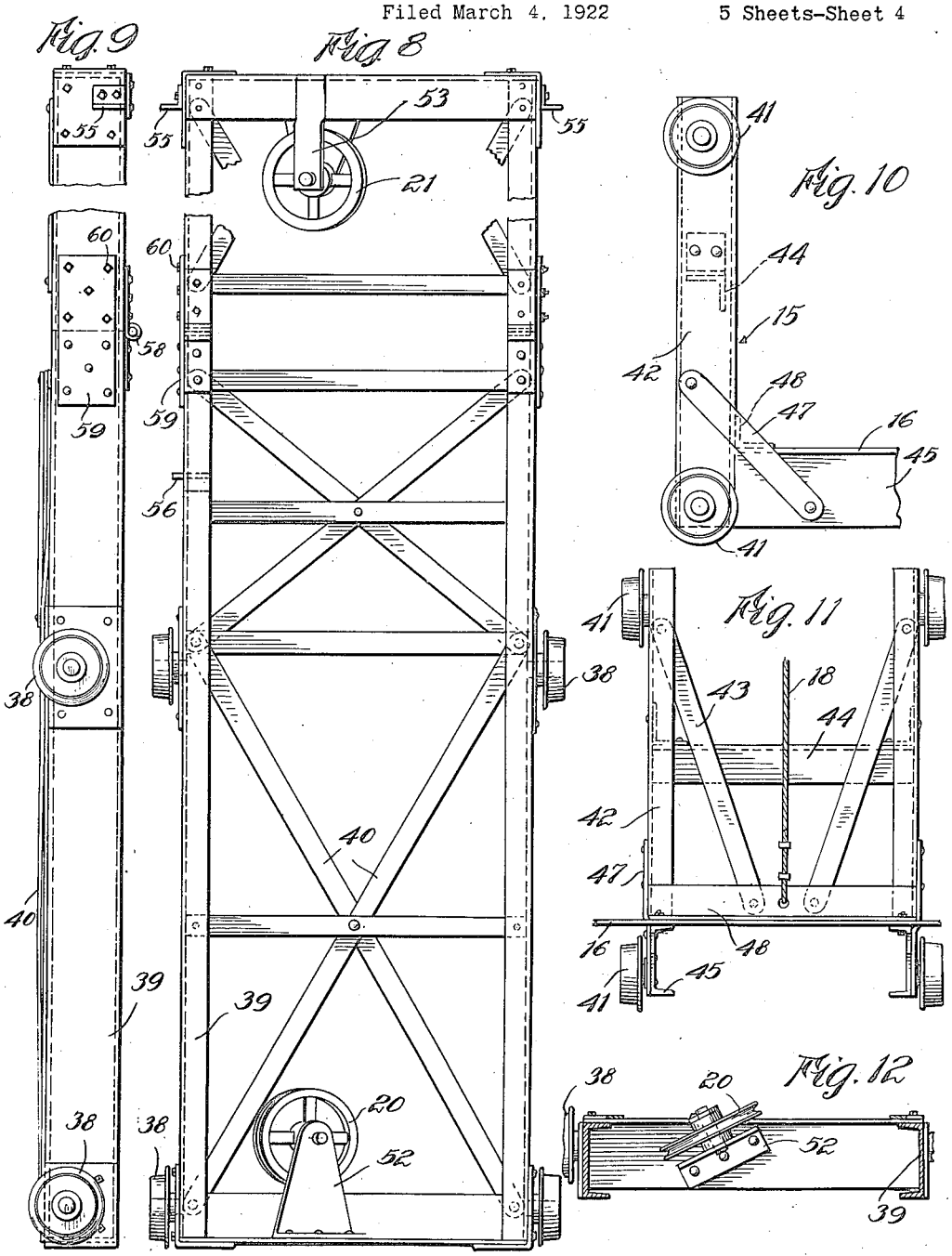

W. B. PAVEY

PORTABLE ELEVATOR

Filed March 4, 1922

1,458,195

5 Sheets-Sheet 5

Inventor
William B. Pavey
By Churchill Parker & Carlson
Attys

Patented June 12, 1923.

1,458,195

UNITED STATES PATENT OFFICE.

WILLIAM B. PAVEY, OF CHICAGO, ILLINOIS, ASSIGNOR TO ECONOMY ENGINEERING COMPANY, OF CHICAGO, ILLINOIS, A CORPORATION OF ILLINOIS.

PORTABLE ELEVATOR.

Application filed March 4, 1922. Serial No. 540,957.

*To all whom it may concern:*

Be it known that I, WILLIAM B. PAVEY, a citizen of the United States, residing at Chicago, in the county of Cook and State of Illinois, have invented certain new and useful Portable Elevators, of which the following is a specification.

The invention pertains to elevators of the type which are capable of being moved about within a building for use at various places therein as may be required. Elevating machines of this general class, as commonly constructed, employ an upright frame stationarily mounted upon a movable base, and forming a guideway for a vertically movable platform or other load support. The height, therefore, to which the load may be elevated is limited in such machines to a point somewhat below the upper end of the upright frame.

Frequently machines of this general type are employed in warehouses having inclined or sloping roofs or ceilings, ventilating monitors and other irregularities therein and since the height of the upright frame must, in the case of a machine of the prior art, be limited so that its upper end will clear the lowest point in the roof, it is impossible to elevate the load to points above such minimum height.

The principal object of this invention is to produce an elevator of this general class by means of which it is possible to elevate the load to a point a substantial distance above the upper end of the stationary upright frame, and which at the same time is capable of use wherever prior machines can be employed. The machine as thus constructed is capable of overcoming the deficiency of prior machines above indicated. Moreover, it is rendered capable of use in various other places where previous machines were impossible of use, such, for instance, as in elevating the load through an opening in a sidewalk which forms the roof or ceiling of a basement storage room.

A further object of the invention is to produce a machine capable of accomplishing this result which is of a practical character by reason of its relative simplicity in construction, and further by reason of the extreme ease with which the machine may be extended and retracted at the will of the operator.

Figure 13:
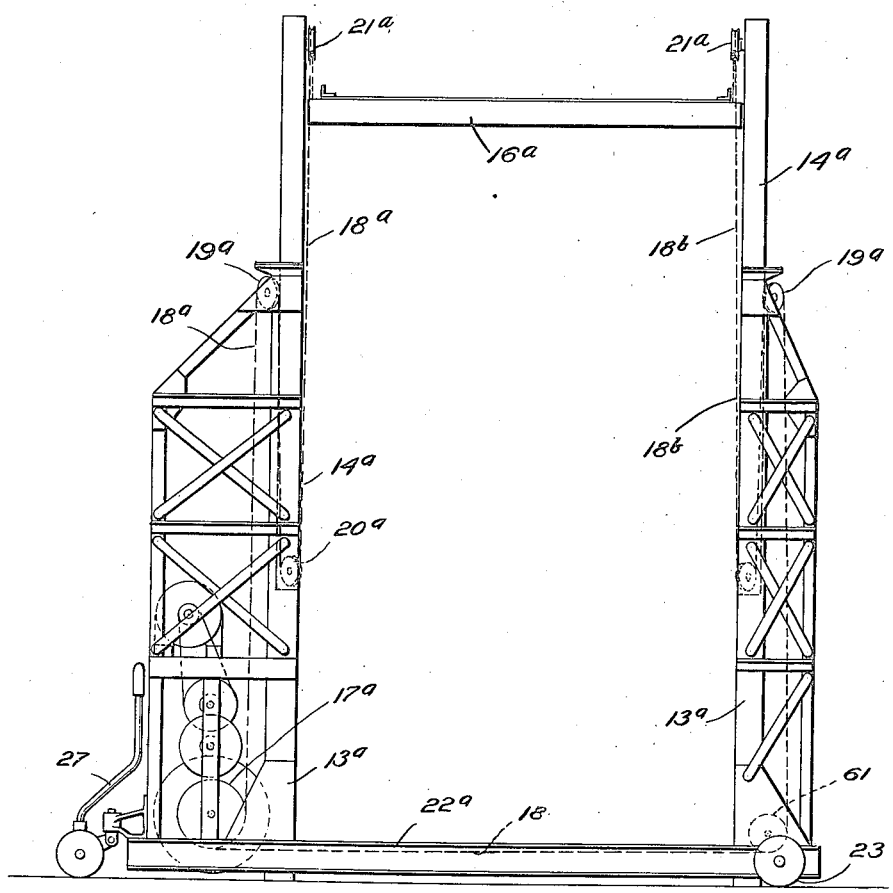
Figure 14:
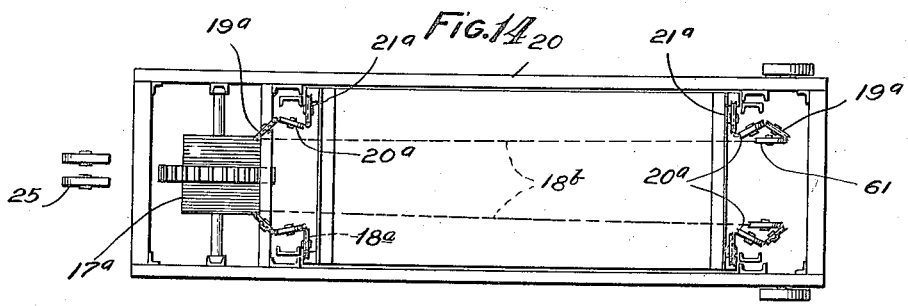

Other and ancillary advantages of the invention will be apparent from the following description taken in connection with the accompanying drawings forming part hereof in which Figures 1 and 2 are side elevational views diagrammatic in character, illustrating respectively my improved machine in its extended and retracted forms. Fig. 3 is a side elevation of the machine in its most compact form. Fig. 4 is a fragmentary end view of the machine illustrating the manner in which the several telescoping frames which I employ coact. Fig. 5 is a fragmentary top plan view illustrating the stops for limiting the movement of one of the frames. Fig. 6 is a fragmentary sectional view illustrating the mounting of one of the cable guide pulleys or sheaves. Fig. 7 is an elevational section illustrating another one of said cable guide sheaves. Fig. 8 is a fragmentary elevational view of the extensible frame detached. Fig. 9 is a fragmentary end view of the same. Fig. 10 is a fragmentary side view of the platform frame and support. Fig. 11 is a fragmentary end view of the platform frame and support. Fig. 12 is a transverse sectional view through the lower portion of the extensible frame. Fig. 13 is a diagrammatic view illustrating in side elevation another embodiment of the invention. Fig. 14 is a similar view showing the same in plan.

In carrying out my invention, I employ in addition to the usual upright stationary frame 13, an auxiliary frame 14 which is mounted for up and down movements in the frame 13 and in turn provides a runway for a vertically movable frame carrying the load-supporting platform 16. A winding drum 17 has one end of a cable 18 secured thereto, and the latter after passing successively over a sheave 19 mounted upon the upper end of the frame 13, a sheave 20 mounted in the lower end of the frame 14 and a sheave 21 mounted in the upper end of the frame 14, is connected to the platform frame 15. By this means, when the drum 17 is actuated to wind the cable, the frame 15 for the load platform is first elevated to its extreme upward position, as shown in Fig. 2. The upward movement of this platform carrying frame being limited, the continued operation of the winding drum causes the frame 14 to raise with respect to the frame 13, and such elevation may continue, within a predetermined limit (Fig. 2) to the height to which the load is to be carried. It will be observed, therefore, that I obtain the desired result without the use of any additional winding or hoisting equipment other than the extension of the cable and the employment of two additional cable guiding sheaves.

The frame 13 (Fig. 3) is supported in any suitable or preferred manner upon a base frame 22 mounted at one end upon wheels 23 and supported at its other end either by a leg 24 or a wheel 25. The latter is preferably mounted for pivotal movement, upon an axis 26, through the operation of a handle 27 so as to lift the leg 24 from off the floor.

Adjacent one side of the frame 13 and secured thereto and to the horizontal base frame 22, is an auxiliary frame work 28 in which is mounted the hoisting and brake mechanism. This mechanism may be of any suitable or preferred construction. In its details, it forms no part of the present invention, and hence need not be illustrated and described in particularity. Suffice it to say that it comprises the winding drum 17 which is arranged to be driven through a gear train 30 by the operation of either of two shafts 31 and 32, the latter being herein shown as adapted to receive an operating crank 33. Associated with the hoisting mechanism is a brake mechanism 34 having a controlling handle 35.

The construction of the frame 13 is, in accordance with common practice, such as to provide runways for guiding the load in its up and down movements. Thus it comprises a pair of channel bars 36 connected in spaced relation by means of suitable diagonal and cross bars 37 and opening inwardly so as to form guidways for rollers 38.

The rollers 38 in the present instance are mounted upon the extension frame 14. This frame is constructed in a manner similar to that of the frame 13. Thus it comprises opposite side bars 39 of channel form arranged with their flanges extending inwardly and connected by suitable braces 40 in spaced relation such as to enable the frame to telescope within the frame 13. Herein four rollers 38 are employed, two at the extreme lower end of the frame 14 and two spaced a substantial distance above the lower end of the frame. These rollers may be secured to the frame in any suitable way.

The channel bars 39 provide, in turn, runways for rollers 41 carried by the platform supporting frame 15, which is arranged to be guided in its up and down movements by the frame 14. This frame 15 may be of any suitable or preferred construction. Herein it comprises a pair of upright members 42 of channel form connected by a cross bar 43 and suitable braces 44. At the lower ends of said members 42 are secured horizontal outwardly extending bars 45 upon which is supported the platform 16. Gusset bars 47 are secured to the upright members 42 and to the horizontal bars 45. An angle iron 48 is secured to the upper rear edge of the platform, the members 43 being connected thereto. In the present instance the extreme end of the cable 18 is secured to this angle iron, the opposite end of the cable being secured to the winding drum as above indicated.

The sheave 19 over which the cable 18 passes from the winding drum is mounted at the upper end of the stationary upright frame 13. In the present instance it is carried between a cross bar 49 of channel form and an angle bar 50, and preferably it is mounted within a yoke 51 pivoted at its opposite ends to the bars 49 and 50 so that it may swivel to accommodate the lateral motion of the winding cable due to its travel upon the winding drum.

The sheave 20 at the lower end of the frame 14 may be secured to the lower cross bar of said frame upon a bracket 52 and the sheave 21 at the upper end of the frame 14 is, in the present instance, mounted upon the upper cross bar of the frame by means of a depending arm 53 and bracket 54.

It will be obvious that upon the rotation of the winding drum through the operation of either of the shafts 31 or 32 by the crank 33, the platform 16 will be guided for up and down movements by its rollers 41 operating in runways provided by the channel bars 39 of the frame 14; and that the latter frame will be guided in its up and down movements by the frame 13 through the medium of the rollers 38 operating in the runways provided by the channel bars 36.

Preferably I employ stops to limit the movement of the various frames with respect to each other. Thus referring to Figs. 4 and 8 I provide angle irons 55 rigid with the frame 14 and adapted to engage with the upper end of the frame 13 to limit the downward movement of the frame 14; and somewhat above the lower end of the frame 14 I provide a stop member 56 adapted to engage with a stop 56ᵃ on the cross bar 49 at the upper end of the frame 13, to limit the upward movement of the frame 14. When the frame 15 approaches the upper limit of its movement with respect to the frame 14, it engages the upper cross bar of the latter, whereupon the continued operation of the winding drum causes the frame 14 to elevate together with the platform frame 15.

It is usual in portable elevators of this class to provide a construction such that the machine may be reduced in height sufficiently to enable it to pass through a doorway. Thus the stationary upright guide frame is usually made sectional in construction whereby an upper section 13ª may be folded downwardly with respect to the main section, the parts being hinged together as shown at 57 (Fig. 3). To accommodate my present machine to such construction, I preferably make the frame 14 in two sections hinged together at 58. Normally, however, these sections are preferably rigidly secured together by side plates 59 and bolts 60, and when it is desired to fold the upper section downwardly with respect to the main section, the bolts 60 on the upper section are removed as shown in Fig. 3.

It may be observed that I have produced a portable elevator or tiering machine of simple economical and otherwise practical construction. By its use, it is possible to utilize substantially all of the space in a storage warehouse and especially that adjacent the roof or ceiling, even though the roof may be so irregular in form or inclined from the horizontal as to render it impractical, if not impossible, to use tiering machines as ordinarily constructed. Obviously the utilization of such space results in a substantial saving over even a relatively small period of time. At the same time my improved elevator is capable of use wherever other machines may be used. Indeed, it will be apparent that through the provision of the auxiliary or extensible frame, the stationary guide frame may, if desired, be made of less height than is practicable in ordinary tiering machines so that the machine is rendered capable of use in places such as basement rooms having relatively low ceilings. Moreover, it is possible to use my improved machine to advantage as a stationary elevator, as when it is employed for raising or lowering a load through an opening in the roof of a basement storage room when the latter is formed by an overhead sidewalk. This, of course, has been impossible with prior elevators of this type.

In Figs. 13 and 14 I have shown diagrammatically my invention as embodied in a machine for handling extremely heavy loads, such, for example, as rolls of paper and the like. In this instance two upright stationary frames 13ª are mounted in spaced relation upon a horizontal frame 22ª, and in each of these frames is mounted a vertically sliding frame 14ª. The latter two frames provide guideways for the opposite ends of a platform 16ª to which is connected at each corner a winding cable running to a double drum 17ª. Each section of said drum has a pair of cables 18ª and 18ᵇ wound thereon. The cables 18ª of the two drum sections lead over upper stationary sheaves 19ª on opposite sides of the stationary frame 13ª adjacent the hoisting mechanism, and then downwardly over sheaves 20ª at the lower ends of the frames 14ª on opposite sides thereof. From these sheaves the cables pass upwardly to sheaves 21ª upon the upper ends of the frames 14ª and thence downwardly for connection with the platform at its two corners adjacent the hoisting mechanism. The cables 18ᵇ follow a similar course and finally connect with the opposite corners of the platform, but these cables first cross over from their respective winding drums to stationary sheaves 61 suitably mounted adjacent the lower end of the opposite frame 13ª.

It may be observed that even in this case I utilize a single unitary hoisting mechanism for the platform and the movable guide frames, and that such mechanism is simple and effectual.

While I have herein illustrated and described the invention in considerable detail, it will be understood that I contemplate that various changes may be made by those skilled in the art in the form, construction and arrangement of the parts without departing from the spirit and scope of the invention as expressed in the appended claims.

I claim as my invention:

1. A portable tiering machine comprising a stationary upright frame, an auxiliary frame guided for up and down movements relative to the stationary frame, a load-carrying frame guided for up and down movements with respect to the auxiliary frame, hoisting mechanism operatively connected with the auxiliary frame and then with the load frame, brake mechanism operatively associated with the hoisting mechanism, and means for limiting the movement of the load-carrying frame with respect to the auxiliary frame, the arrangement being such that the load frame is first actuated by the hoisting mechanism and subsequently the auxiliary frame is actuated through the load frame.

2. A tiering machine having, in combination, a stationary upright frame, a hoisting mechanism, a brake mechanism operatively associated with said hoisting mechanism, an auxiliary frame guided for up and down movement by said stationary frame, and a load-supporting platform guided by the auxiliary frame for up and down movements relative thereto, said hoisting means including a single winding drum and cable operatively connecting the platform with said auxiliary frame and said winding drum.

3. A portable tiering machine having a main or base frame mounted for movement from place to place, a stationary upright guide frame mounted upon the main frame, an auxiliary or extension frame guided for up and down movements by the stationary upright frame, a platform guided for up and down movements with respect to the auxiliary frame, and a single winding mechanism for raising and lowering the auxiliary frame and the platform.

4. In a raising and lowering apparatus, the combination of an upright stationary frame, an auxiliary or extension frame mounted for up and down movements relative to the said stationary frame, a load carrier guided for up and down movements with respect to said auxiliary frame, and a hoisting mechanism including a sheave mounted upon the stationary frame, a pair of sheaves on the auxiliary frame, and a cable passing successively over the first mentioned sheave and the pair of sheaves and thence connected with the load carrier.

5. A raising and lowering machine comprising a stationary upright frame, an auxiliary frame and a load-carrying frame, said frames being mounted for relative up and down movement, a sheave carried at the upper end of the stationary frame, sheaves carried by the opposite ends of the auxiliary frame, and hoisting mechanism including a cable passing over said sheaves successively and connected with said load frame.

6. In a raising and lowering machine, a load support, and means for mounting said support for up and down movements including a vertically movable frame, and hoisting mechanism operable to elevate successively said load support and said vertically movable frame.

7. In a raising and lowering machine, a load carrier, and means for mounting said carrier for up and down movements including an auxiliary support, and a hoisting mechanism including a stationarily mounted sheave, a pair of sheaves on the auxiliary support, and a cable passing first over the stationarily mounted sheave, then over the pair of sheaves and finally connected with said load carrier.

8. In a raising and lowering machine, a load platform, and means for mounting said platform for up and down movements including a pair of upright stationary frames, a vertically movable frame guided by each of said stationary frames, the opposite ends of said platform being guided for up and down movement in the movable frames, and a single unitary hoisting mechanism connected with the two movable frames and the opposite ends of the platform to effect the up and down movement thereof.

9. A machine of the class described having a stationary upright support, an auxiliary support mounted for up and down movement relative to the stationary support, a third support mounted for up and down movement relative to the auxiliary support, and a single hoisting mechanism operable to effect such relative movement between the supports.

10. A machine of the class described having three supporting members mounted for limited relative up and down movement, and a single hoisting mechanism operable to impart relative movement first between two of the supports and then between said two supports and the third support.

11. The combination, in a machine of the class described, of a base, a vertical support on the base, a load-carrier, extension means mounted upon said vertical support and having said carrier mounted for movement therewith, said extension means being movable relative to said vertical support to a position such as to carry the load carrier a substantial distance above the support, and hoisting mechanism connected with said carrier and acting therethrough to effect such relative movement between the support and the extension means.

12. The combination in an apparatus of the class described, of an upright support, a load carrier, extension means mounted upon said support and having said carrier mounted for movement therewith, said extension means being movable vertically with respect to said support to a position such as to carry the load carrier a substantial distance above the support, and a single hoisting mechanism for effecting such relative movement between the support and the extension means.

In testimony whereof, I have hereunto affixed my signature.

WILLIAM B. PAVEY.